United States Patent
Bowling et al.

(10) Patent No.: US 11,763,170 B2
(45) Date of Patent: Sep. 19, 2023

(54) METHOD AND SYSTEM FOR PREDICTING DISCRETE SEQUENCES USING DEEP CONTEXT TREE WEIGHTING

(71) Applicants: Sony Corporation, Tokyo (JP); Sony Corporation of America, New York, NY (US)

(72) Inventors: Michael Bowling, Edmonton (CA); Satinder Baveja, Ann Arbor, MI (US); Peter Wurman, Acton, MA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 971 days.

(21) Appl. No.: 15/888,619

(22) Filed: Feb. 5, 2018

(65) Prior Publication Data

US 2019/0244112 A1    Aug. 8, 2019

(51) Int. Cl.
*G06N 5/02* (2023.01)
*G06N 20/00* (2019.01)

(52) U.S. Cl.
CPC .............. *G06N 5/02* (2013.01); *G06N 20/00* (2019.01)

(58) Field of Classification Search
CPC ............ G06N 5/00; G06N 5/02; G06N 5/022; G06N 5/025; G06N 5/04; G06N 5/046; G06N 5/047; G06N 20/00; G06N 20/20; G06N 3/044; G06N 3/08; G06N 3/045
See application file for complete search history.

(56) References Cited

U.S. PATENT DOCUMENTS

| | | | |
|---|---|---|---|
| 6,594,524 B2 * | 7/2003 | Esteller | G16H 50/20 607/45 |
| 9,997,039 B1 * | 6/2018 | Heaton | G08B 21/0461 |
| 10,289,910 B1 | 5/2019 | Chen et al. | |
| 2008/0059274 A1 * | 3/2008 | Holliday | G06Q 10/0639 705/7.31 |
| 2014/0095412 A1 * | 4/2014 | Agashe | G06F 16/24578 706/46 |
| 2015/0290798 A1 | 10/2015 | Iwatake | |
| 2019/0012371 A1 * | 1/2019 | Campbell | G06F 16/3329 |

(Continued)

OTHER PUBLICATIONS

Wang et. al., "genCNN: a Convolutional Architecture for Word Sequence Prediction", 2015, arXiv, 2015, pp. 1-13 (Year: 2015).*

(Continued)

*Primary Examiner* — Ann J Lo
*Assistant Examiner* — Leonard A Sieger
(74) *Attorney, Agent, or Firm* — INNOVATION CAPITAL LAW GROUP, LLP; Vic Lin

(57) ABSTRACT

Systems and methods use deep, convolutional neural networks over exponentially long history windows to learn alphabets for context tree weighting (CTW) for prediction. Known issues of depth and breadth in conventional context tree weighting predictions are addressed by the systems and methods. To deal with depth, the history can be broken into time windows, permitting the ability to look exponentially far back while having less information the further one looks back. To deal with breadth, a deep neural network classifier can be used to learn to map arbitrary length histories to a small output symbol alphabet. The sequence of symbols produced by such a classifier over the history windows would then become the input sequence to CTW.

11 Claims, 3 Drawing Sheets

(56) References Cited

U.S. PATENT DOCUMENTS

| | | | |
|---|---|---|---|
| 2019/0130312 A1 | 5/2019 | Xiong et al. | |
| 2019/0261566 A1 | 8/2019 | Robertson et al. | |
| 2019/0347621 A1 | 11/2019 | White | |
| 2020/0090042 A1 | 3/2020 | Wayne et al. | |
| 2020/0211106 A1* | 7/2020 | Pan | G06Q 40/025 |
| 2021/0187733 A1 | 6/2021 | Lee et al. | |

OTHER PUBLICATIONS

Begleiter et. al., "On Prediction Using Variable Order Markov Models", 2004, Journal of Artificial Intelligence Research, 22 (2004), pp. 385-421 (Year: 2004).*
Thorhallsson et. al., "Visualizing the Bias Variance Tradeoff", 2017, University of British Columbia, 2017, pp. 1-9 (Year: 2017).*
Wu et. al., "A Novel Sensory Mapping Design for Bipedal Walking on a Sloped Surface", 2012, International Journal of Advanced Robotic Systems, 9 (2012), pp. 1-9 (Year: 2012).*
Zhong et. al., "Toward a self-organizing pre-symbolic neural model representing sensorimotor primitives", 2014, Frontiers in Behavioral Neuroscience, vol. 8, pp. 1-11 (Year: 2014).*
Bellemare et. al., "Skip Context Tree Switching", 2014, Proceedings of the 31st International Conference on Machine Learning, vol. 32(2), pp. 1458-1466 (Year: 2014).*
Tjalkens et al., "Context Tree Weighting: Multi-Alphabet Sources", 1993, Proceedings of the 14th Symposium on Information Theory in the Benelux, vol. 14(1993), pp. 128-135 (Year: 1993).*
Brandes et al., "ASAP: a Machine Learning Framework for Local Protein Properties", 2016, Database, vol. 2016, pp. 1-10 (Year: 2016).*
Wang et. al., "genCNN: a Convolutional Architecture for Word Sequence Prediction ", 2015, arXiv, v2, pp. 1-13 (Year: 2015).*
Zaheer et al., "Latent LSTM Allocation: Joint Clustering and Non-Linear Dynamic Modeling of Sequence Data", 2017, Proceedings of the 34th International Conference on Machine Learning, vol. 34 (2017), pp. 3967-3976 (Year: 2017).*
Willems, et al., "The Context-Tree Weighting Method: Basic Properties", IEEE Transactions on Information Theory, vol. 41, No. 3, May 1995, pp. 653-664.
Anna Gruebler, Coaching robot behavior using continuous physiological affective feedback, 2011 11th IEEE-RAS International Conference on Humanoid Robots, Bled, Slovenia, Oct. 26-28, 2011 (Year: 2011).
Jens Kober, Reinforcement learning in robotics: a survey, The International Journal of Robotics Research, 32(11)1238-1274, 2013 (Year: 2013).
Masakazu Hirkoawa, Coaching Robots: Online Behavior Learning from Human Subjective Feedback, I. Jordanov and L.C. Jain (Eds.): Innovations in Intelligent Machines −3, SCI 442, pp. 37-51. (Year: 2013).
Patrick Gruneberg, An Approach to Subjective Computing: a Robot That Learns From Interaction With Humans, IEEE Transactions on Autonomous Mental Development, vol. 6, No. 1, Mar. 2014 (Year: 2014).
Botvinick, Matthew Michael. "Hierarchical reinforcement learning and decision making." Current opinion in neurobiology 22.6 (2012) : 956-962.
Florensa, Carlos, et al. "Reverse curriculum generation for reinforcement learning." Conference on robot learning. PMLR, 2017.
Grollman ("Robot Learning from Failed Demonstrations") Int J Soc Robot (2012) 4:331-342, Jun. 30, 2012 © Springer Science & Business Media BV 2012 (Year: 2012).
Katyal ("Leveraging Deep Reinforcement Learning for Reaching Robotic Tasks") Proceedings of the IEEE Conference on Computer Vision and Pattern Recognition (CVPR) Workshops, 2017, pp. 18-19 (Year: 2017).
Nicolescu ("Natural Methods for Robot Task Learning: Instructive Demonstrations, Generalization and Practice") AAMAS'03, Jul. 14-18, 2003, Melbourne, Australia. (Year: 2003).
Vecerik, Mel, et al. "Leveraging demonstrations for deep reinforcement learning on robotics problems with sparse rewards." arXiv preprint arXiv: 1707 .08817v1 (2017).
Baranes_2012_Active learning of inverse models with intrinsically motivated goal exploration in robots Robotics and Autonomous Systems 61 (2013) 49-73 (Year: 2012).
Thomaz_2008_Teachable robots: Understanding human teaching behavior to build more effective robot learners Artificial Intelligence 172 (2008) 716-737 (Year: 2008).
RAI ("Learning from failed demonstrations in unreliable systems") u 2013 13th IEEE-RAS International Conference on Humanoid Robots (Humanoids).Oct. 15-17, 2013. Atlanta, GA (Year: 2013).
Zeng ("Object Manipulation Learning by Imitation") arXiv:1603. 00964v3 [cs.RO] Nov. 19, 2017 (Year: 2017).

* cited by examiner

METHOD AND SYSTEM FOR PREDICTING DISCRETE SEQUENCES USING DEEP CONTEXT TREE WEIGHTING

BACKGROUND OF THE INVENTION

1. Field of the Invention

One or more embodiments of the invention relates generally to prediction systems and methods applicable to intelligent artificial agents. More particularly, the invention relates to methods and systems for predicting discrete sequences using deep context tree weighting to overcome problems associated with general context tree weighting.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Learning of sequential data is a fundamental task and a challenge in machine learning. Applications involving sequential data may require prediction of new events, generation of new sequences, or decision making. Lossless compression is a conventional application of discrete sequence prediction algorithms. Context tree weighting (CTW) is one type of lossless compression that has found application in the prediction of discrete sequences. The general concept of CTW was introduced in 1995 by Willems, Shtarkov and Tjalkens, in their paper entitled *The Context-Tree Weighting Method: Basic Properties* (41, IEEE Transactions on Information Theory), the contents of which are herein incorporated by reference.

Context trees (CTs) or more generally, context tree weighting, is an effective approach to prediction of discrete sequences over a finite alphabet. In essence, this prediction method learns a variable-history Markov model, which describes how the prediction of the next symbol given a history of previously seen symbols in a sequence is a function of a variable length finite history, where the length depends on the specific suffix of the sequence thus far.

CTW's prediction of the next symbol, however, can only depend on short histories, which gives rise to a depth problem. Additionally, CTW's prediction gets worse as one increases the alphabet size, which gives rise to a breadth problem. In many applications, in order to get good predictions, the learned function has to condition its predictions on symbols that occurred far back in history and where the number of possible observations is very large or infinite (e.g., continuous).

With respect to the depth problem, if the prediction needs to look far into the past, then CTW's memory requirements are problematic. Practically, one does not see CTW implementations with histories much longer than 64 or 128, and even these are binary trees. If the data frequency is, for example, 30 Hz, this amounts to about four seconds in the past. Even at one minute samples, one can only condition predictions at the level of hours. As the time interval increases, the size of the alphabet usually also increases, adding to the breadth problem.

With respect to the breadth problem, if the number of possible observations at a timestep is large, then the tree will be too sparse to learn. Most CTW implementations work with binary trees, providing on/off observations. This makes it difficult to handle more interesting event streams. Even without considering continuous data, since multiple binary events could occur over any time window, the alphabet is exponential in the number of devices or events.

In view of the foregoing, it is clear that there is a need for a system and method for implementing CTW in a manner that addresses the depth and breadth problems described above.

SUMMARY OF THE INVENTION

Embodiments of the present invention further provide an artificial intelligence system comprising a computing device including at least one processor, one or more data storage devices, and a non-transitory data storage medium interfaced with the at least one processor, the non-transitory data storage medium containing instructions that, when executed cause at least one processor to: (1) save observed sensory sequence information in a plurality of history windows, wherein a size of the plurality of history windows increase exponentially from a last observed time step; (2) apply a function to the observed sensory sequence information in each history window, wherein the function maps the observed sensory sequence information into a fixed set of discrete classes, fixed for all of the plurality of history windows; and (3) applying a context tree weighting algorithm to an alphabet resulting from the fixed set of discrete classes for each of the plurality of history windows to predict a future discrete sequence.

Embodiments of the present invention also provide an artificial intelligence system comprising a computing device including at least one processor, one or more data storage devices, and a non-transitory data storage medium interfaced with the at least one processor, the non-transitory data storage medium containing instructions that, when executed cause the at least one processor to: (1) save observed sensory sequence information in a plurality of history windows, wherein the size of the plurality of history windows increases exponentially from a last observed time step; (2) apply a function to the observed sensory sequence information in each history window, wherein the function maps the observed sensory sequence information into a fixed set of discrete classes, fixed for all of the plurality of history windows; (3) choose at least one parameter of the exponentially increasing history window size as a hyperparameter to allow the system to trade off bias-variance; (4) apply a context tree weighting algorithm to the alphabet resulting from the fixed set of discrete classes for each of the plurality of history windows to predict a future discrete sequence; and (5) use a deep neural network classifier to map arbitrary length histories to a minimal output symbol alphabet as an input sequence for the context tree weighting algorithm.

Embodiments of the present invention provide an artificial intelligence system comprising a computing device including at least one processor, one or more data storage devices, and a non-transitory data storage medium interfaced with the at least one processor, the non-transitory data storage medium containing instructions that, when executed cause the at least one processor to: (1) save observed sensory sequence information in a plurality of history windows, wherein a size of the plurality of history windows increase exponentially from a last observed time step; (2) apply a function to the observed sensory sequence information in each history window, wherein the function maps the observed sensory sequence information into a fixed set of discrete classes, fixed for all of the plurality of history windows; (3) choose at least one parameter of the exponentially increasing history window size as a hyperparameter to allow the system to trade off bias-variance; (4) apply a context tree weighting algorithm to an alphabet resulting from the fixed set of discrete classes for each of the plurality of history windows to predict a future discrete sequence; and (5) perform a temporal convolution in a deep neural network to map observed sensory sequence information from the plurality of history windows to symbols, wherein the temporal convolution includes defining each of the plurality of history windows of events as a ($2^k$)-by-n matrix, where $2^k$ is a number of time steps in each of the plurality of history windows and n is a number of events at each of the time steps, and applying a convolution that is an l-by-n matric, where l is a small number, wherein a set of the convolutions produces a new set of events.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
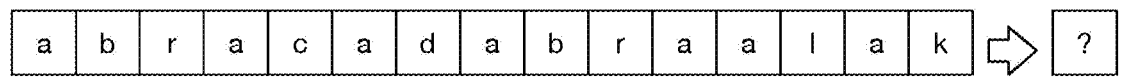
FIG. 1 illustrates an exemplary question where an answer is to be predicted by the methods and systems of the present invention.

Unless otherwise indicated illustrations in the figures are not necessarily drawn to scale. The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" or "computing device" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, an EEPROM or any other memory chip or cartridge, a carrier wave as described hereinafter, or any other medium from which a computer can read.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device. A "computing platform" may comprise one or more processors.

The term "robot" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CDROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer readable media.

While a non-transitory computer-readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Many practical embodiments of the present invention provide means and methods for efficient performance of activities by an artificial intelligent agent.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about agent's action(s) may include, without limitation, a probability distribution over agent's action(s), and/or outgoing information meant to influence the agent's ultimate choice of action.

The term "state" or "state information" refers to any collection of information regarding the state of the environment or agent, which may include, without limitation, information about the agent's current and/or past observations.

Broadly, embodiments of the present invention provide systems and methods for using deep, convolutional neural networks over exponentially long history windows to learn alphabets for context tree weighting for prediction. Known issues of depth and breadth in conventional context tree weighting predictions are addressed by the systems and methods of the present invention. To deal with depth, the history can be broken into time windows, permitting the ability to look exponentially far back while having less information the further one looks back. To deal with breadth, a deep neural network classifier can be used to learn to map arbitrary length histories to a small output symbol alphabet. The sequence of symbols produced by such a classifier over the history windows would then become the input sequence to CTW.

A discussion of CTW and its use for predictions may be found, for example, in Begleiter, et al., *On Prediction Using Variable Order Markov Models* (Journal of Artificial Intelligence Research 22 (2004) 385-421), the contents of which are herein incorporated by reference.

Embodiments of the present invention extend CTW into what is described as "deep CT", where one uses the novel approach of deep (convolutional) neural networks over exponentially longer history windows to learn alphabets for CTW for prediction.

Depth

As discussed above, if the prediction needs to look far into the past, then CTW's memory requirements are problematic. Deep CT can extend the depth of CTW exponentially. To obtain this result, exponentially increasing (from the last time step observed) history windows are used as input to deep neural networks to generate symbols. By choosing the parameters of the increasing history window size as a hyperparameter allows the method to trade off bias-variance (i.e., it allows further adaptation to the statistics in the data). This results in maintaining the powerful variable depth aspect of CTW, where the depth used to make a prediction in Deep CT is adaptive and learned from data, but this depth can be exponentially longer than conventionally CTW.

To deal with depth, the history can be broken into time windows. Then, the ordered context for a prediction at time, t, is the sequence c(o), c(1), c(2), c(3), . . . where $c(k)=C(w(t-2^{(k+1)}), \ldots, w(t-2^k))$, where C is some function of the observed sensory information within the time window. The data in time window k can be defined as w(k). While C could simply be the identity map, it may be best understood as a sort of feature map with a fixed number of features, regardless of window size. In some embodiments, C may be considered as a class labels, where C maps sensory data from time windows into a small, fixed set of discrete classes. Thus, the range of C becomes the alphabet for CTW and one ends up being able to look exponentially far back while having less information the further one looks back.

Ultimately, C is what deep learning learns. One example of a hard-coded C function is a feature-wise maximum over time steps in the window. Thus, the context of a time window is for each binary event—did it occur in the window in question. Recent contexts can have a high degree of specificity in the event, while, as one looks at windows further back in time, the specificity about when an event occurs is less. Note that with this C function, the alphabet is still exponential in the number of events, because any combination of events might still occur, but such an issue is dealt with, as the issue of breadth, below.

Figure 2A:
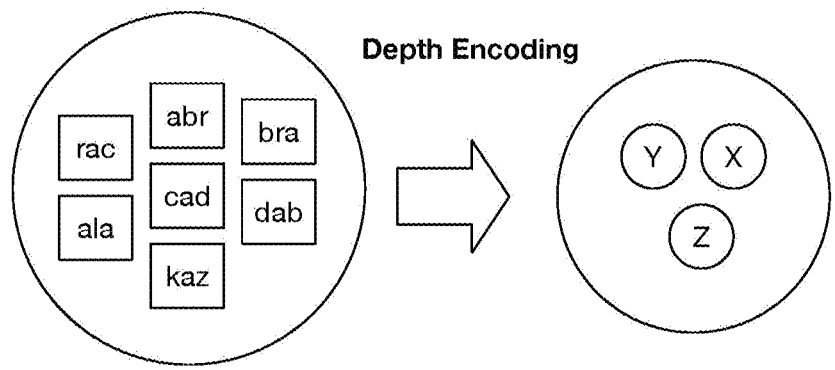
FIG. 2A illustrates a schematic representation of depth encoding, or how the temporal convolution step can map patters of an original alphabet into a smaller, abstract alphabet.
Figure 2B:
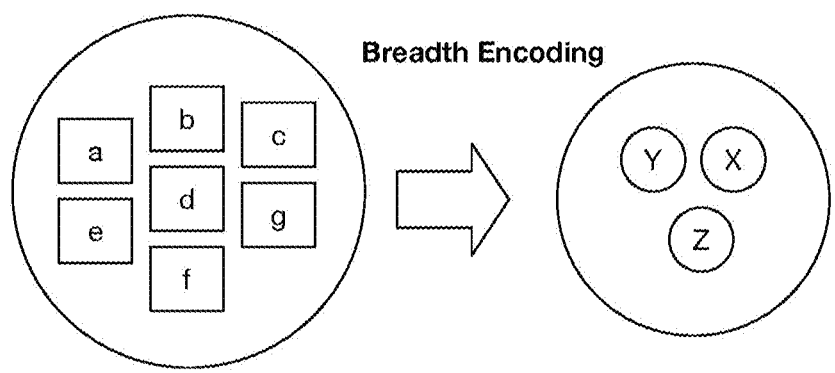
FIG. 2B illustrates a schematic representation of breadth encoding, or how the temporal convolution step can be used to reduce a large alphabet into a smaller one.

Referring to FIG. 1, there is shown a history sequence, where the system and methods of the present invention desire to predict the next result based on this sequence. FIG. 2 shows an example of how the problem of depth may be handled by the system and methods of the present invention. Here, a temporal convolution step may be used to map patterns of the original alphabet, as shown in FIG. 1, into a smaller, abstract alphabet containing X, Y and Z, for example. As discussed below, this abstract alphabet may be used for making predictions via the deep CTW methods of the present invention.

Breadth

Deep CT can extend CTW to handle very large or infinite (e.g., continuous) observations. In some embodiments, a deep neural network classifier can be used to learn to map arbitrary length histories, such as a long short-term memory (LSTM)-based sequence to symbol method, to a small output symbol alphabet. The sequence of symbols produced by such a classifier over the history windows would then become the input sequence to CTW.

In this embodiment, the output of C can be a soft-classification. Thus, C(w) can be thought of as giving a distribution over a fixed alphabet of size |A|. C can be parameterized. As a specific example, imagine taking the hand-coded feature-wise maximum function over the window as noted above and then place a linear function, with weight parameters, theta, followed by a multiclass logistic. This makes sure C(w) is positive and sums to 1 over the alphabet.

On top of this context function, CTW is running over the alphabet A. One can update CTW by either sampling from the C(w) distribution, or updating CTW using the expectations. But then, one can also update theta to improve its mapping of windows of data to the alphabet. This is the gradient of the log probability of the data with respect to theta and can be calculated efficiently by using the chain rule. Thus, one can run gradient descent on theta to produce alphabets that make the observed data more probable while also updating the model of how the prediction is conditioned on the learned context.

One trivial extension of this is to replace the linear/logistic-regression context function with a deep, multilayer neural network ending in a logistic function.

Figure 3:
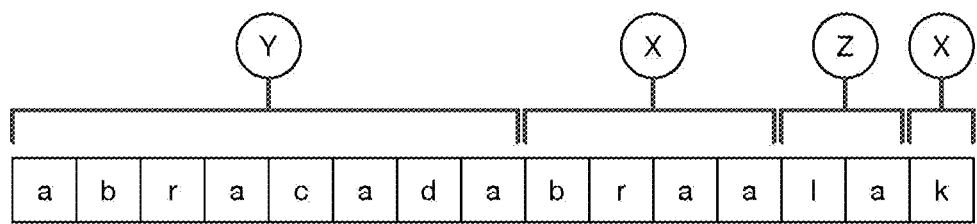
FIG. 3 illustrates how a function can be learned that maps varying length sections of history into the abstract alphabet.

Referring now to FIG. 3, there is shown how a temporal convolution step can be used to reduce a large alphabet into a smaller one. The history windows shown in FIG. 3 can be non-overlapping, as illustrated, where the sensory information from each history window can be mapped into discrete classes, resulting in the abstract alphabet for CTW. Both the mappings of FIGS. 2 and 3 may occur at the same time.

In some embodiments, a deep neural network can be used to do a form of "temporal convolution" similar to the highly successful spatial convolutions used in computer vision to map histories to symbols. The sequence of symbols produced by such a classifier over the history windows would then become the input sequence to CTW. These approaches can use hyperparameters that can be tuned to various classes of applications.

In this embodiment, one can view a time window of events as a ($2^k$)-by-n matrix. The $2^k$ comes from the window having $2^k$ timesteps in it, and the n in the matrix being n (binary) events at each timestep. Imagine a convolution that is an l-by-n matric, where l is a small number, such as 2 or 3. So it can look at the co-occurrence of events at the same or nearby timesteps. A set of such convolutions produces a new set of events. Stacking these layers, like a convolutional neural network (CNN) can produce higher-level events, including sequences of events. After applying some number of these convolution layers, one can still take the maximum of the resulting events, thus making the C function independent of the size of the time window, after which one can do a fully-connected linear layer, or two, followed by a logistic function to map into the alphabet.

Because the C functions are the same regardless of the size of the time window, the same function, with the same convolutional patterns, can be applied at every time window and hence, every timescale. The largest gradients will appear at the short time-scales since CTW puts its prior weight on short contexts, but one can easily learn what patterns are predictive at this scale, and then be finding these same patterns at the longer contexts, which are likely to be useful there as well.

Figure 4:
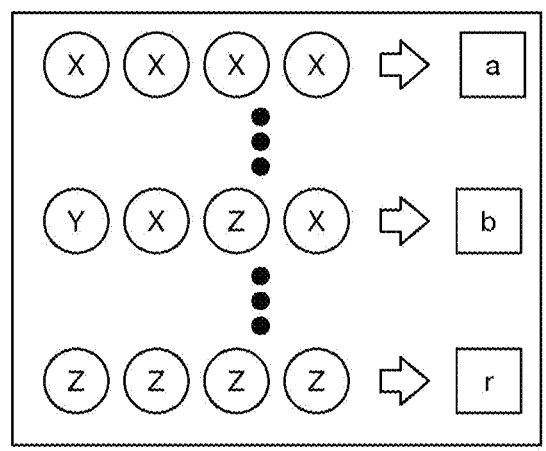
FIG. 4 illustrates how the system and methods of the present invention, using deep CTW, can make predictions in the original alphabet based on the patterns in the abstract alphabet.
Figure 5:
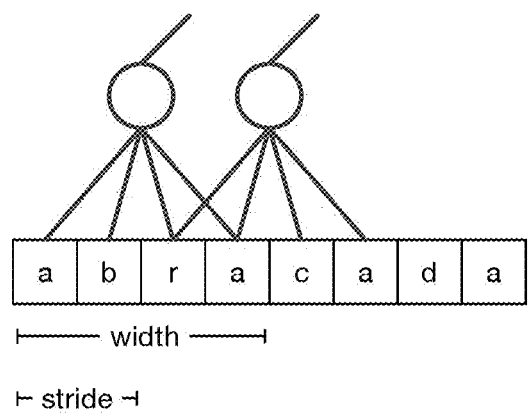
FIG. 5 illustrates how the function of FIG. 3 is implemented as a deep neural net made of smaller convolutional units with width and stride (offset), where all units of the same type share weights.

Referring to FIGS. 3 and 4, a function can be learned that maps varying length sections of the history into the abstract alphabet. With this mapping, the CTW can make predictions in the original alphabet based on the patterns in the abstract alphabet, as exemplified in FIG. 4. In some embodiments, the CTW may make predictions in the abstract alphabet as opposed to the original alphabet.

Figure 6:
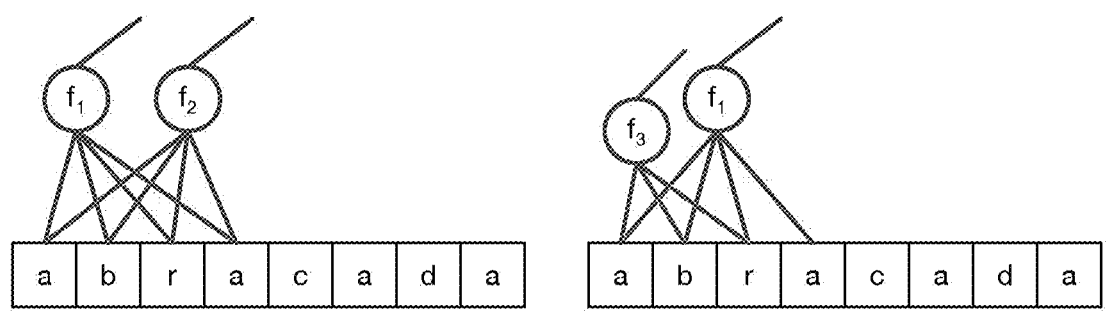
FIG. 6 illustrates how superimposed units can learn different functions, $f_1$ and $f_2$, of the same input regions, and overlap with units of different widths.

As discussed above, and as shown in FIGS. 5 through 8, the function of FIG. 3 can be implemented as a deep neural net made of small convolutional units with width and stride (offset). In this embodiment, all the units of the same type may share weights, however, it should be understood that the weights do not have to be shared across all time window sizes. As shown in FIG. 6, superimposed units can learn different functions, $f_1$ and $f_2$, of the same input regions and overlap with units of different widths.

Figure 7:
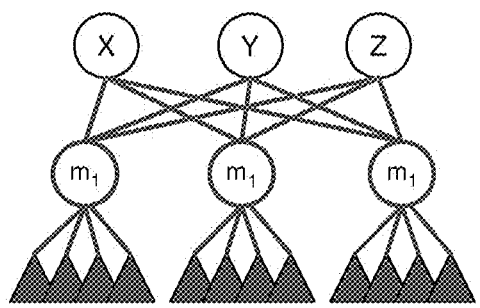
FIG. 7 illustrates how MaxPool functions can be used to aggregate the outputs of each unit type, where the final, fully connected layer learns the mapping between the MaxPool results and the abstract alphabet.

As shown in FIG. 7, MaxPool may be used to keep the height of the neural net the same, where MaxPool can aggregate the outputs of each unit type. The final, fully connected layer can learn the mapping between the MaxPool results and the abstract alphabet, as shown in FIG. 7. In some embodiments, rather than use MaxPool to keep the heights the same, the height of the neural network could change with the size of the window.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An artificial intelligence system, comprising: a computing device including at least one processor, one or more data storage devices, and a non-transitory data storage medium interfaced with the at least one processor, the non-transitory data storage medium containing instructions that, when executed cause the at least one processor to:
    save observed sensory sequence information, as an original alphabet, in a plurality of history windows, the plurality of history windows being reverse chronological history windows, wherein a size of the plurality of history windows increase exponentially, wherein the plurality of history windows do not overlap;
    apply a function to the observed sensory sequence information in each history window, wherein the function maps the observed sensory sequence information into a fixed set of discrete classes, wherein the fixed set of discrete classes is the same fixed set of discrete classes across each of the plurality of history windows;
    perform a temporal convolution in a deep neural network to map observed sensory sequence information from the plurality of history windows to symbols,
    wherein the temporal convolution includes defining each of the plurality of history windows of events as a ($2^k$)-by-n matrix, where $2^k$ is a number of time steps in each of the plurality of history windows and n is a number of events at each of the time steps, and applying a convolution that is an l-by-n matrix, where 1 is less than $2^k$, wherein a set of the convolutions produces a new set of events;

apply a context tree weighting algorithm to an abstract alphabet resulting from the fixed set of discrete classes for each of the plurality of history windows, wherein the abstract alphabet is smaller in size than the original alphabet; and make a prediction in the original alphabet based on patterns in the abstract alphabet.

2. The artificial intelligence system of claim 1, wherein the instructions cause the at least one processor to choose at least one hyperparameter for each of the plurality of history window to allow the system to trade off bias-variance.

3. The artificial intelligence system of claim 1, wherein the function is a feature-wise maximum over time steps in one or more of the plurality of history windows.

4. The artificial intelligence system of claim 3, wherein the observed sensory sequence information is a binary event.

5. The artificial intelligence system of claim 1, wherein the instructions cause the at least one processor to use a deep neural network classifier to map arbitrary length histories to a second alphabet having smaller length than the alphabet of the arbitrary length histories as an input sequence for the context tree weighting algorithm.

6. The artificial intelligence system of claim 5, wherein a long short-term memory-based sequence to symbol method is used to map the arbitrary length histories to the second alphabet having smaller length than the alphabet of the arbitrary length histories.

7. The artificial intelligence system of claim 1, wherein the convolution is applied to each of the plurality of history windows.

8. An artificial intelligence system, comprising: a computing device including at least one processor, one or more data storage devices, and a non-transitory data storage medium interfaced with the at least one processor, the non-transitory data storage medium containing instructions that, when executed cause the at least one processor to:

save observed sensory sequence information, as an original alphabet, in a plurality of history windows, the plurality of history windows being reverse chronological history windows, wherein a size of the plurality of history windows increase exponentially, wherein the plurality of history windows do not overlap;

apply a function to the observed sensory sequence information in each history window, wherein the function maps the observed sensory sequence information into a fixed set of discrete classes, wherein the fixed set of discrete classes is the same fixed set of discrete classes across each of the plurality of history windows;

choose at least one hyperparameter for each of the plurality of history window to allow the system to trade off bias-variance;

use a deep neural network classifier to map arbitrary length histories to an abstract alphabet having smaller length than the original alphabet of the arbitrary length history windows as an input sequence for the context tree weighting algorithm;

apply a context tree weighting algorithm to the abstract alphabet resulting from the fixed set of discrete classes for each of the plurality of history windows;

perform a temporal convolution in a deep neural network to map observed sensory sequence information from the plurality of history windows to symbols, wherein the temporal convolution includes defining each of the plurality of history windows of events as a ($2^k$)-by-n matrix, where $2^k$ is a number of time steps in each of the plurality of history windows and n is a number of events at each of the time steps, and applying a convolution that is an 1-by-n matrix, where 1 is less than $2^k$, wherein a set of the convolutions produces a new set of events; and make a prediction in the original alphabet based on patterns in the abstract alphabet.

9. The artificial intelligence system of claim 8, wherein a long short-term memory-based sequence to symbol method is used to map the arbitrary length histories to the second alphabet having smaller length than the alphabet of the arbitrary length histories.

10. The artificial intelligence system of claim 8, wherein the observed sensory sequence information is a binary event.

11. An artificial intelligence system, comprising: a computing device including at least one processor, one or more data storage devices, and a non-transitory data storage medium interfaced with the at least one processor, the non-transitory data storage medium containing instructions that, when executed cause the at least one processor to:

save observed sensory sequence information, as an original alphabet, in a plurality of history windows, the plurality of history windows being reverse chronological history windows, wherein a size of the plurality of history windows increase exponentially, wherein the plurality of history windows do not overlap;

apply a function to the observed sensory sequence information in each history window, wherein the function maps the observed sensory sequence information into a fixed set of discrete classes, wherein the fixed set of discrete classes is the same fixed set of discrete classes across each of the plurality of history windows;

choose at least one hyperparameter for each of the plurality of history window to allow the system to trade off bias-variance;

perform a temporal convolution in a deep neural network to map observed sensory sequence information from the plurality of history windows to the abstract alphabet, wherein the temporal convolution includes defining each of the plurality of history windows of events as a ($2^k$)-by-n matrix, where $2^k$ is a number of time steps in each of the plurality of history windows and n is a number of events at each of the time steps, and applying a convolution that is an 1-by-n matric, where 1 is less than $2^k$, wherein a set of the convolutions produces a new set of events, wherein the set of the convolutions includes a predetermined number of convolution layers, wherein the temporal convolution determines a maximum of the resulting events and ensures the fixed set of discrete classes is independent from the size of each of the plurality of history windows;

apply a context tree weighting algorithm to the abstract alphabet resulting from the fixed set of discrete classes for each of the plurality of history windows to predict a future discrete sequence, wherein the abstract alphabet is smaller in size than the original alphabet; and make a prediction in the original alphabet based on patterns in the abstract alphabet.

* * * * *